United States Patent
Yoo (10) Patent No.: US 6,792,842 B2
(45) Date of Patent: Sep. 21, 2004

(54) PIN KIT FOR V-CUTTER

(75) Inventor: Young Ho Yoo, Kyunggido (KR)

(73) Assignee: Fawoo Technology Co., LTD (KR)

( * ) Notice: Subject to any disclaimer, the term of this patent is extended or adjusted under 35 U.S.C. 154(b) by 157 days.

(21) Appl. No.: 09/766,774

(22) Filed: Jan. 22, 2001

(65) Prior Publication Data

US 2002/0056355 A1 May 16, 2002

(30) Foreign Application Priority Data

Nov. 11, 2000 (KR) .................................. 10-2000-66973
Dec. 26, 2000 (KR) ............................... 20-2000-36380 U (51) Int. Cl.$^7$ ................................................ B26D 3/06
(52) U.S. Cl. ...................... 83/883; 33/41.4; 83/698.31; 83/699.61
(58) Field of Search ............................. 83/698.31, 582, 83/882, 875, 879, 880, 881, 699.61, 883; 30/164.9; 33/41.4

(56) References Cited

U.S. PATENT DOCUMENTS

| | | | | |
|---|---|---|---|---|
| 389,404 A | * | 9/1888 | O'Neill | ........................ 83/686 |
| 2,680,296 A | * | 6/1954 | Cronberger | .................. 33/41.4 |
| 2,744,329 A | * | 5/1956 | Way et al. | .................... 33/18.1 |
| 3,271,862 A | * | 9/1966 | Stein | ........................... 33/18.1 |
| 3,828,637 A | * | 8/1974 | Slack | ........................... 83/348 |
| 4,815,212 A | * | 3/1989 | Wood | ........................... 33/41.4 |
| 6,099,177 A | * | 8/2000 | Ito | .............................. 400/132 |
| 6,319,747 B1 | * | 11/2001 | Todisco et al. | ................ 438/94 |

* cited by examiner

Primary Examiner—Ken Peterson
(74) Attorney, Agent, or Firm—Madson & Metcalf (57) ABSTRACT

A V-cutter for use in manufacturing a light guide panel of the backlight unit in liquid crystal display (LCD), and more specifically, a kit with a plurality of pins for the V-cutter is disclosed. The pin kit may be used to form a plurality of V-shaped grooves spaced apart by a desired, varying interval on the light guide panel. The pin kit may include a buffer plate (10) fixed to a lift piece (7), an elastic member (11) fixed in the longitudinal direction at bottom thereof, a guide plate (14) in which insertion holes (15) for a plurality of pins (12) are formed to permit contact between the pins and the elastic member, and a plurality of pins (12) to be inserted into the insertion holes of the guide plate for forming V-shaped grooves (3) on the light guide panel (1).

8 Claims, 10 Drawing Sheets

PIN KIT FOR V-CUTTER

BACKGROUND OF THE INVENTION

1. Technical Field

The present invention relates to a V-cutter used in manufacturing a light guide panel for a backlight unit in a liquid crystal display (LCD), and more particularly, to a kit with a plurality of pins for a V-cutter designed to form a plurality of V-shaped grooves spaced apart by a desired interval on the light guide panel.

2. Background Art

An LCD (liquid crystal display) unit, such as may be used in a flat panel computer screen, is not self-illuminating, and therefore requires a separate backlight unit with a light source behind the LCD unit.

Because a large investment in the LCD industry has been made in Japan, Korea, and Taiwan, demand for the LCD unit, backlight unit, and other related parts is increasing.

Recently, LCD units have become smaller and lighter. Accordingly, backlight units for the new LCD units have become thinner and lighter through the use of a side light configuration.

In a backlight unit with a side light configuration, the emitted light by a light source to the side of the light guide panel is dispersed to have a uniform luminance across the light guide panel, so that a regular pattern is formed on the bottom of the light guide panel.

Since the light source for emitting the light is disposed on the side of the light guide panel, the pattern with a wider interval is disposed at the area adjacent to the light source and the pattern with a narrower interval is disposed at the area far from the light source, in order to keep the luminance uniform across the surface of the light guide panel.

The pattern on the bottom of the light guide panel used to disperse the light from the side-mounted light source may be, for example, a known groove pattern type for a TFT-LCD monitor or a notebook computer screen.

Figure 1:
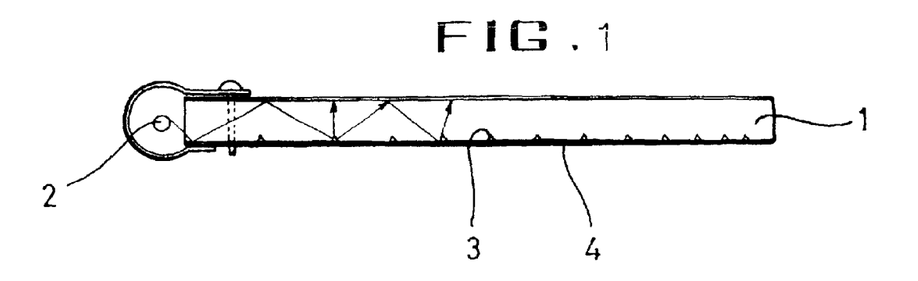
FIG. 1 is a longitudinal sectional view of a backlight unit with V-shaped grooves formed in the light guide panel according to a pattern.

FIG. 1 is a longitudinal sectional view of one example of a backlight unit with light guide panels disposed in a groove pattern in which the upper portion is a plane of the light guide panel on which the liquid display elements are disposed, and the lower portion is a bottom of the light guide panel.

On a side of the light guide panel 1 made of a transmission material, such as acrylic or the like, a light source 2 for illuminating the LCD unit is disposed. At the bottom of the light guide panel a plurality of V-shaped grooves 3, or grooves 3, are formed. The V-shaped grooves 3 serve to uniformly disperse the light emitted by the light source 2. A reflecting seat 4 constructed of a reflective material, such as PET, is attached thereon.

The grooves 3 formed on the bottom on the light guide panel 1 disperse the emitted light from the light source 2 across the upper surface of the light guide panel. The grooves 3 are separated by a wider interval in vicinity of the light source 2 because the light against the nearer grooves 3 has a comparatively high luminance. The grooves 3 further from the light source 2 are spaced apart by a narrower interval so that the luminance can be uniformly maintained on the plane of the light guide panel 1.

In the backlight unit, light from the light source is reflected between the LCD unit and the reflective seat 4 until it strikes one of the V-shaped grooves 3. The V-shaped grooves 3 refract the light at such an angle that the light disperses on the inner surface of the light guide panel and impinges relatively directly against the LCD unit, as depicted by the arrows in FIG. 1. The refracted light then provides backlighting for the LCD unit disposed on the upper surface of the light guide panel.

The light emitted by the light source 2 is uniformly refracted by V-shaped grooves 3, which are formed on the plane of the light guide panel 1 by a device called a "V-cutter".

Conventionally, a V-cutter has a lift piece disposed on slider that moves horizontally (along the X-axis) along a guide rail. The lift piece may be vertically actuated by a controller, such as a hydraulic or mechanical cylinder or a step motor. A pin for forming the V-shaped grooves 3 on the light guide panel may be affixed to the bottom surface of the lift piece.

The V-shaped grooves 3 are formed by, first, fixing the light guide panel on a table and moving the slider along the guide rail. The lift piece is lowered to a bottom dead center position by the controller so that the pin forms one of the V-shaped grooves 3 as it moves across the light guide panel.

After formation of the first of the V-shaped grooves 3, the table moves indexes the light guide panel to a different position with respect to the lift piece to form another of the grooves 3 at a pitch, or displacement from the first groove. This process repeats until all of the V-shaped grooves 3 have been formed with the proper pitch.

The conventional method is disadvantageous because the grooves 3 must be formed one-by-one on the light guide panel. Considerable machine and operator time is required. As a result, the lead time and manufacturing cost of the backlight manufacturing process is somewhat high.

Additionally, with the reciprocating movement of the slider along the guide rail, the art table must be indexed by 1 pitch to form the parallel V-shaped grooves 3 on the light guide panel. This indexing typically requires that the table be moved in a direction 90 degrees from the horizontal motion of the slider. This indexing requires additional time for the formation of each groove. As a result, still more time is required to complete formation of the V-shaped grooves 3 on the light guide panel.

Furthermore, the conventional technique utilizes only a single pin to manufacture all of the V-shaped grooves 3. With such heavy use, it is inevitable for the pin to wear out after a comparatively short lifetime. Thus, frequent maintenance of the V-cutter is required, and more light guide panels may need to be scrapped or reworked due to processing with worn-out pins.

BRIEF SUMMARY OF THE INVENTION

The present invention provides a system and method for solving the problems presented by known V-cutters. One object of the invention is to simultaneously form V-shaped grooves through the use of a plurality of pins corresponding to the grooves on the light guide panel.

Another object of the present invention is to provide a V-cutter with an enhanced operating rate, in which pins broken during operation of the cutter are easily and rapidly replaced with new pins.

A further object of the present invention is to provide a V-cutter in which a load applied on the pins can be maintained at the desired level by adjusting an elastic member and a height control bolt disposed on a buffer plate or slant of the buffer plate, while still permitting alteration of the pin loading in response to the pitch of the grooves to be formed.

In order to achieve the objects of the invention, there is provided a pin kit for V-cutter for forming a plurality of V-shaped grooves spaced apart according to a desired interval on a light guide panel. The pin kit may comprise a buffer plate fixed to the lift piece, an elastic member fixed in the longitudinal direction at a bottom end thereof, a guide plate having insertion holes for a plurality of pins that will be in contact with the elastic member, and a pin to be inserted into an insertion hole on the guide plate for forming V-shaped grooves on the light guide panel.

These and other objects, features, and advantages of the present invention will become more fully apparent from the following description and appended claims, or may be learned by the practice of the invention as set forth hereinafter.

BRIEF DESCRIPTION OF THE DRAWINGS

The present invention will be described in detail through use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 2 through 10, is not intended to limit the scope of the invention, as claimed, but is merely representative of presently preferred embodiments of the invention.

Figure 2:
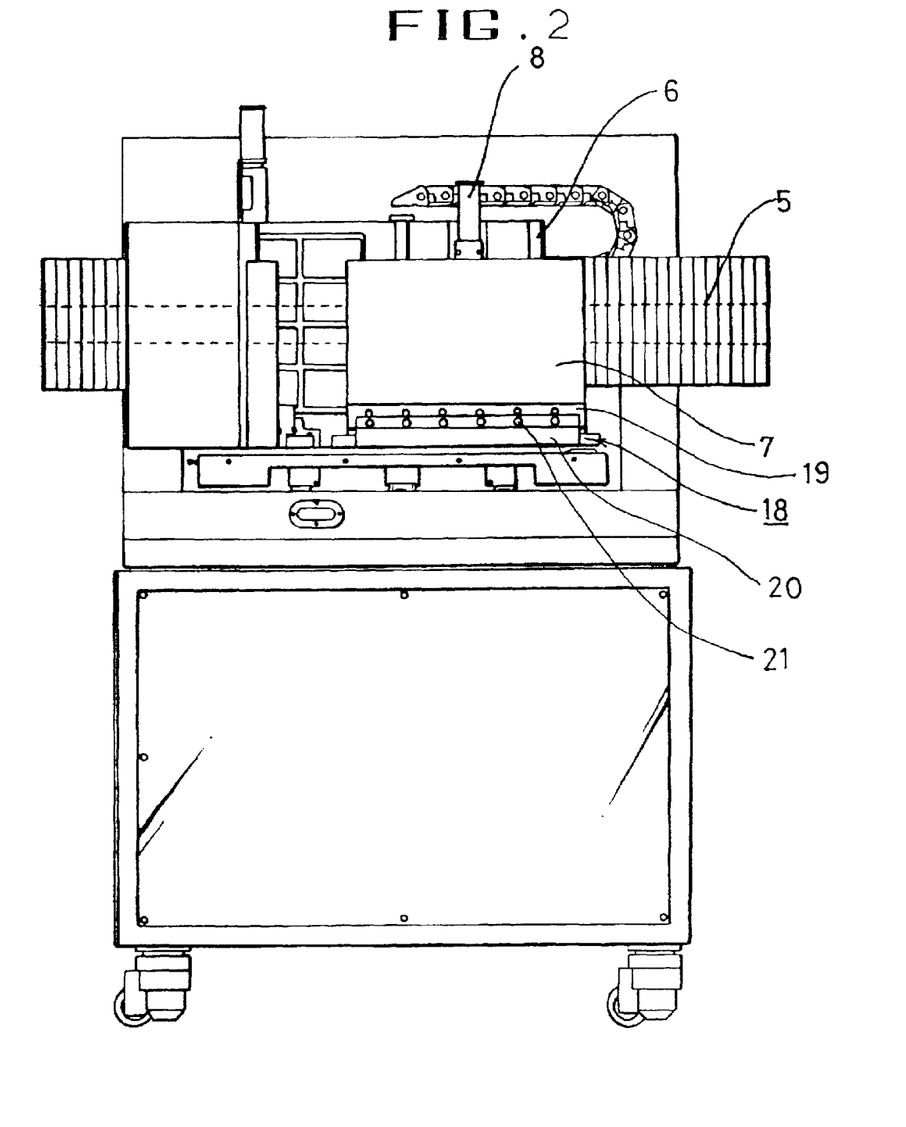
FIG. 2 is a front view of one possible V-cutter according to the present invention.
Figure 3:
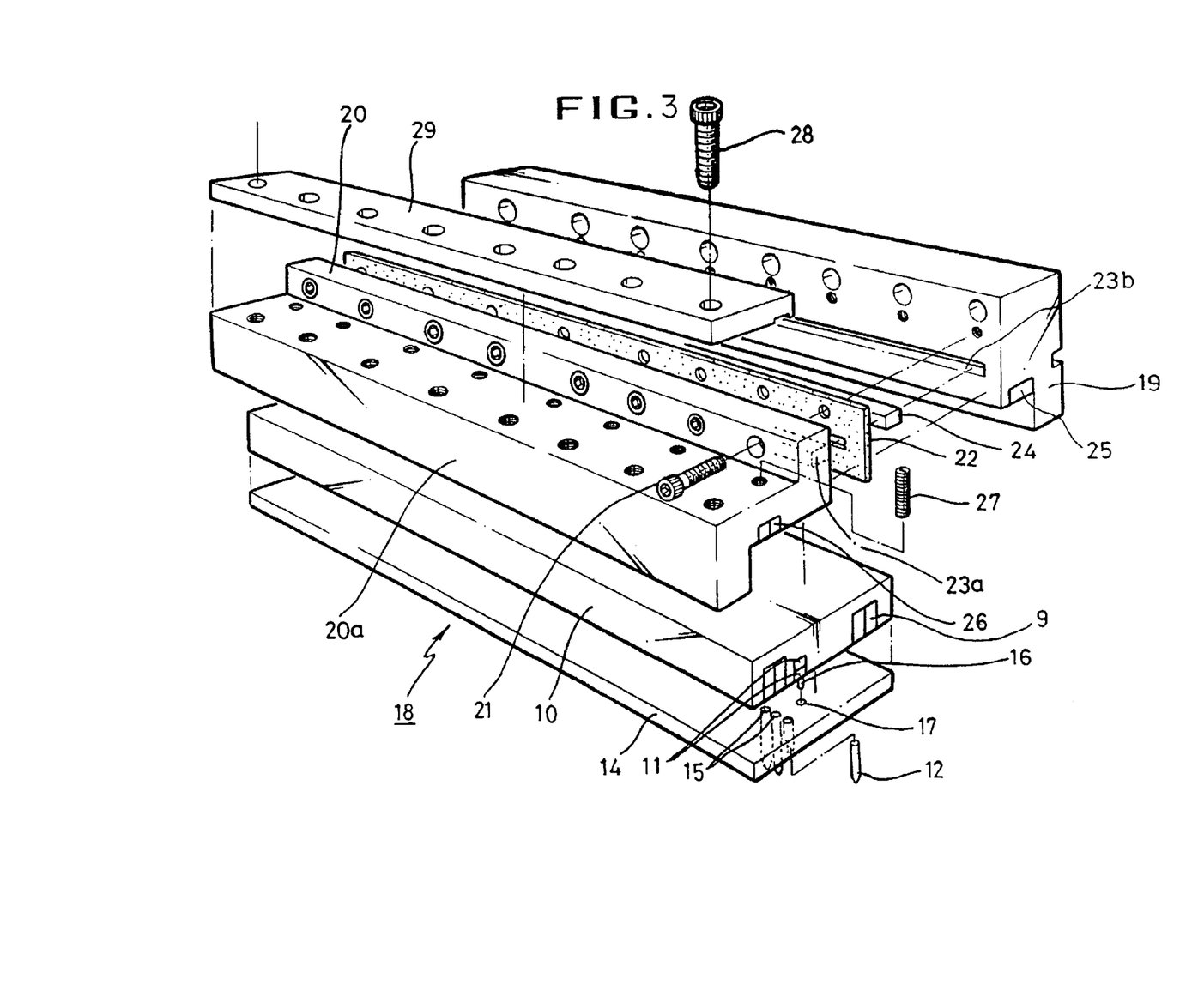
FIG. 3 is an exploded, perspective view of a preferred embodiment pin kit for the V-cutter of FIG. 2, according to the present invention.
Figure 4:
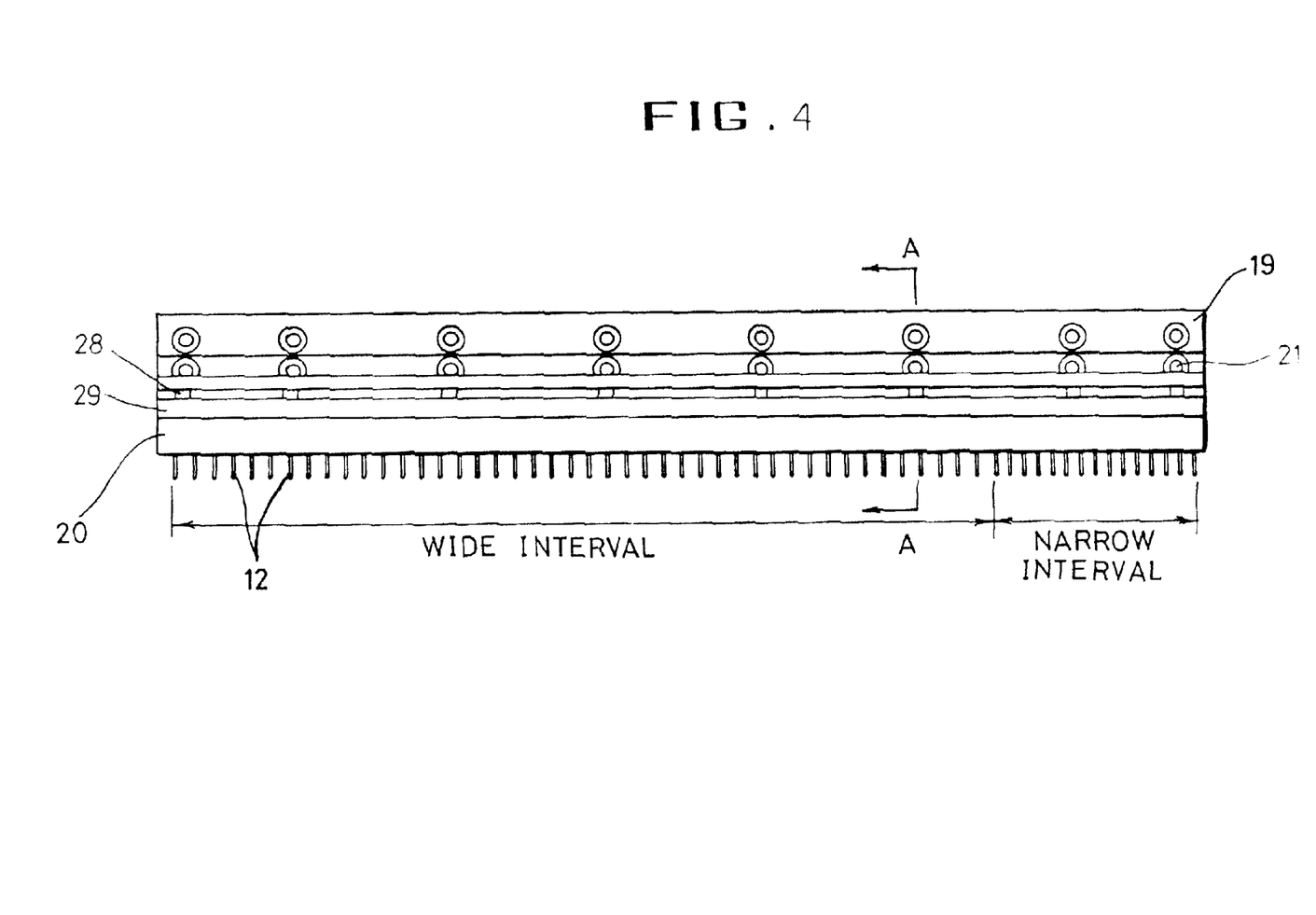
FIG. 4 is a front view of the pin kit of FIG. 3, in a fully-assembled state.
Figure 5:
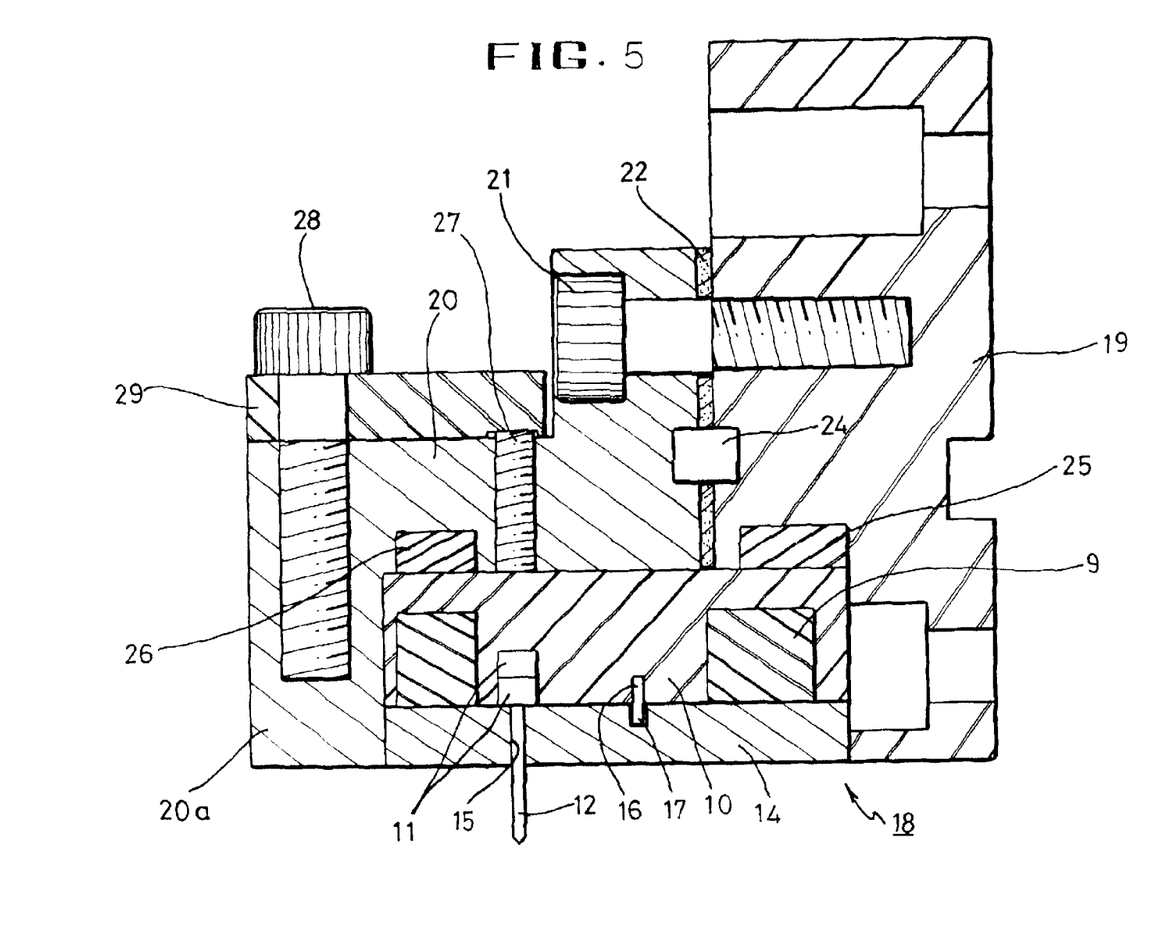
FIG. 5 is a sectional view of the pin kit of FIG. 4, taken along the line A—A.
Figure 7:
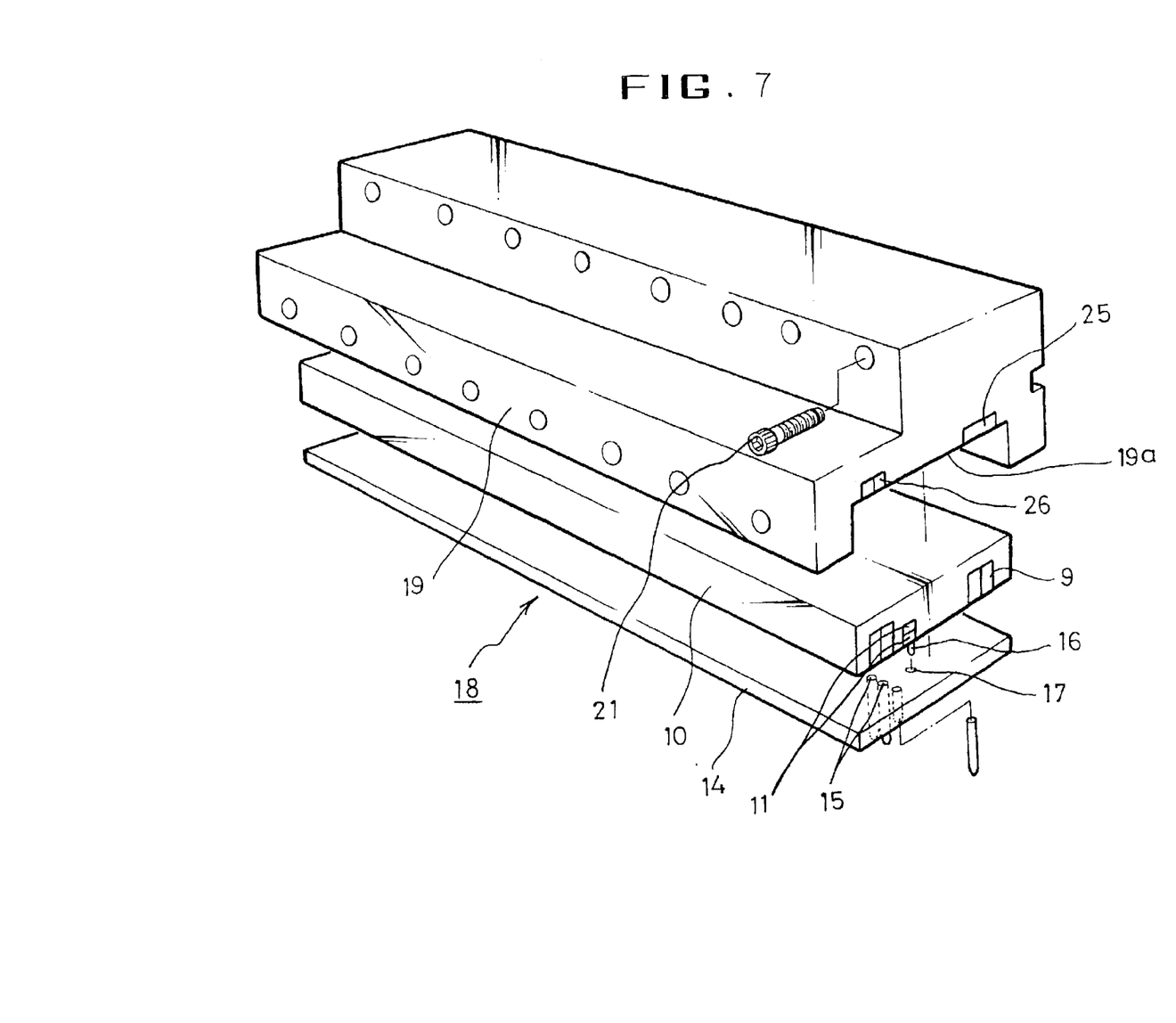
FIG. 7 is an exploded perspective view of another embodiment of a pin kit according to the present invention.

FIG. 2 is a front view showing one possible V-cutter of the present invention, FIG. 3 is a disassembled perspective view of a preferred embodiment according to the present invention, and FIG. 5 is a sectional view of the line A—A of FIG. 4. As shown in FIG. 2, a lift piece 7 may be mounted by a controller 8 on a slider 6 configured to move in the horizontal direction along a guide rail 5. Engaged with the lift piece 7, as shown in FIGS. 5 and 7 buffer plate 10 may be mounted, with a plurality of magnets 9 inserted therein. At the bottom of the buffer plate 10, elastic member 11 is exposed and fixed a groove located in the lower side of the buffer plate in the lateral direction.

As shown in FIG. 2, a lift piece 7 may be mounted by a controller 8 on a slider 6 configured to move in the horizontal direction along a guide rail 5. Engaged with the lift piece 7, as shown in FIGS. 5 and 7 buffer plate 10 may be mounted, with a plurality of magnets 9 inserted therein. At the bottom of the buffer plate 10, elastic member 11 is exposed and fixed within a groove located in the lower side of the buffer plate in the lateral direction.

It is desirable that the elastic member 11 be made of at least two different materials. For example, a lower portion of the elastic member 11 may be formed from a comparatively hard material, and an upper portion of the elastic member 11 may have a softer material.

The elastic member 11 serves to absorb impact on the pin 12 that results from impingement of the pin 12 against the light guide panel 1 during formation of the V-shaped grooves 3. The impact absorption prolongs the useful life of pin 12 by uniformly dispersing the load applied to the pin 12.

A guide plate 14 may be disposed beneath the buffer plate 10. The guide plate 14 may include a plurality of insertion holes 15 aligned with the elastic member 11 so that the pins 12 can be inserted through the insertion holes 15 to abut the elastic member 11.

Under normal operation, the pins 12 do not leave the insertion holes 15 of the guide plate 14 due to magnetic force of the magnets 9 inserted into the buffer plate 10.

In order to ensure that the guide plate 14 is properly aligned with the bottom of the buffer plate 10, at least two joggles 16 may be fixed to the guide plate 14 or the buffer plate and positioned between the plates 10, 14. Corresponding position holes 17 may then be formed in the opposite plate 10 or 14 to receive the joggles 16.

When the guide plate 14 is positioned beneath the buffer plate 10, the joggles 16 are inserted to the position holes 17 so that the guide plate 14 and the buffer plate 10 are in proper alignment with each other.

Figure 11:
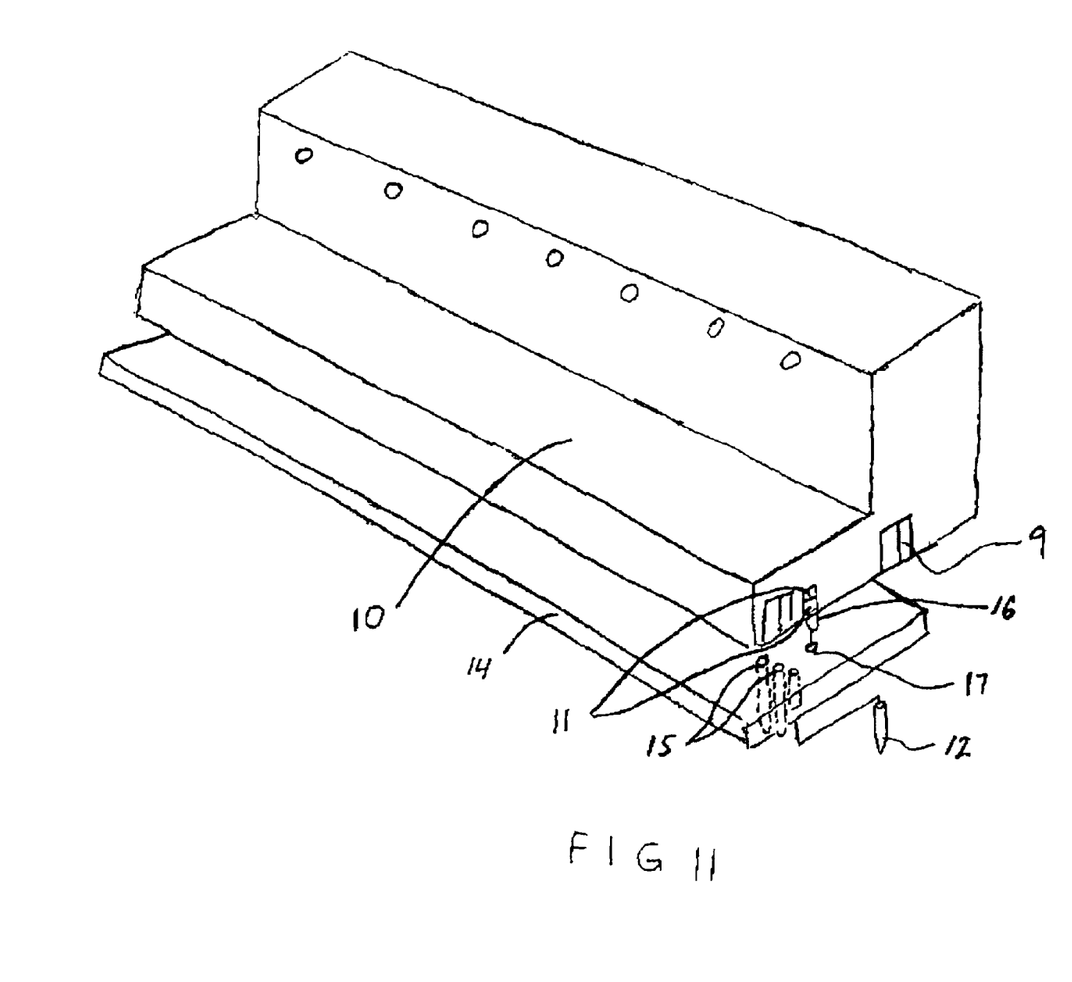
FIG. 11 is an exploded, parspective view of a preferred embodiment pin kit for the V-cutter according to the present invention.

The buffer plate 10 and the guide plate 14 may directly contact the lift piece 7. An example of such an embodiment is illustrated in FIG. 11 in which the buffer plate 10 has been modified such that it may directly contact the lift piece 7. However as seen in FIG. 3, it may also be preferable to have the lift piece 7 affixed to a fixation member 19, which may then be fixed within a clamp 20 through the use of a jaw 20a The buffer plate 10 and the guide plate 14 may then be supported between the fixation member 19 and the clamp 20, as depicted in FIGS. 3 and 4.

The fixation member 19 and the clamp 20 may be engaged by one or more engagements 21, which may take the form of bolts. It is further desirable to insert a rubber plate 22 between the fixation member 19 and the clamp 20 in order to hold the buffer plate and the guide plate 14 in a stable fashion.

Insertion slots 23a and 23b may be formed in the fixation member 19 and the clamp 20, respectively, to accommodate a key 24 to ensure that the clamp 20 is properly positioned with respect to the slots 23b of the fixation member 19.

Before the buffer plate 10 and the guide plate 14 are inserted between the fixation member 19 and the clamp 20, magnets 25 and 26 may be inserted at the bottom of the fixation member 19 and the clamp 20, and the magnet 9 may be inserted into the buffer plate 10. In this manner, the buffer plate 10 and the guide plate 14 may be supported between the fixation member 19 and the clamp 20 without additional fixation mechanisms.

A plurality of height control bolts 27 may be engaged within the clamp 20. The height control bolts 27 may have a head, slot, or the like to facilitate adjustment with the proper tooling. The height control bolts 27 may be adjusted to press the buffer plate 10 downward where the pins 12 are more narrowly spaced apart, so that a heavier load is supported by the elastic member 11 of the narrowly-spaced pins 12 than by those of the widely-spaced pins 12. Even though downward adjustment forms a gap between the buffer plate 10 and the clamp 20, the magnets 25 and 26 keep the buffer plate 10 from falling away from the clamp 20.

Preferably, the buffer plate 10 and the guide plate 14 are each constructed of a somewhat flexible materials, such as a polymer, so that some amount of bending can occur. The buffer plate 10 and guide plate 14 preferably permit an elastic deflection ranging from about 0.01 mm to about 0.1 mm. Thus, the pins 12 need not be adjusted to follow a precisely continuous angle, as may be necessary with a stiff buffer plate 10 and guide plate 14. The narrowly-spaced pins may thus be made to protrude slightly further so that they are, for example, on the order of 0.1 mm longer than the widely-spaced pins 12. As a result, the pins 12 exert a relatively evenly distributed pressure on the light guide panel 1 while the V-shaped grooves 3 are formed.

Figures 6A, 6B:
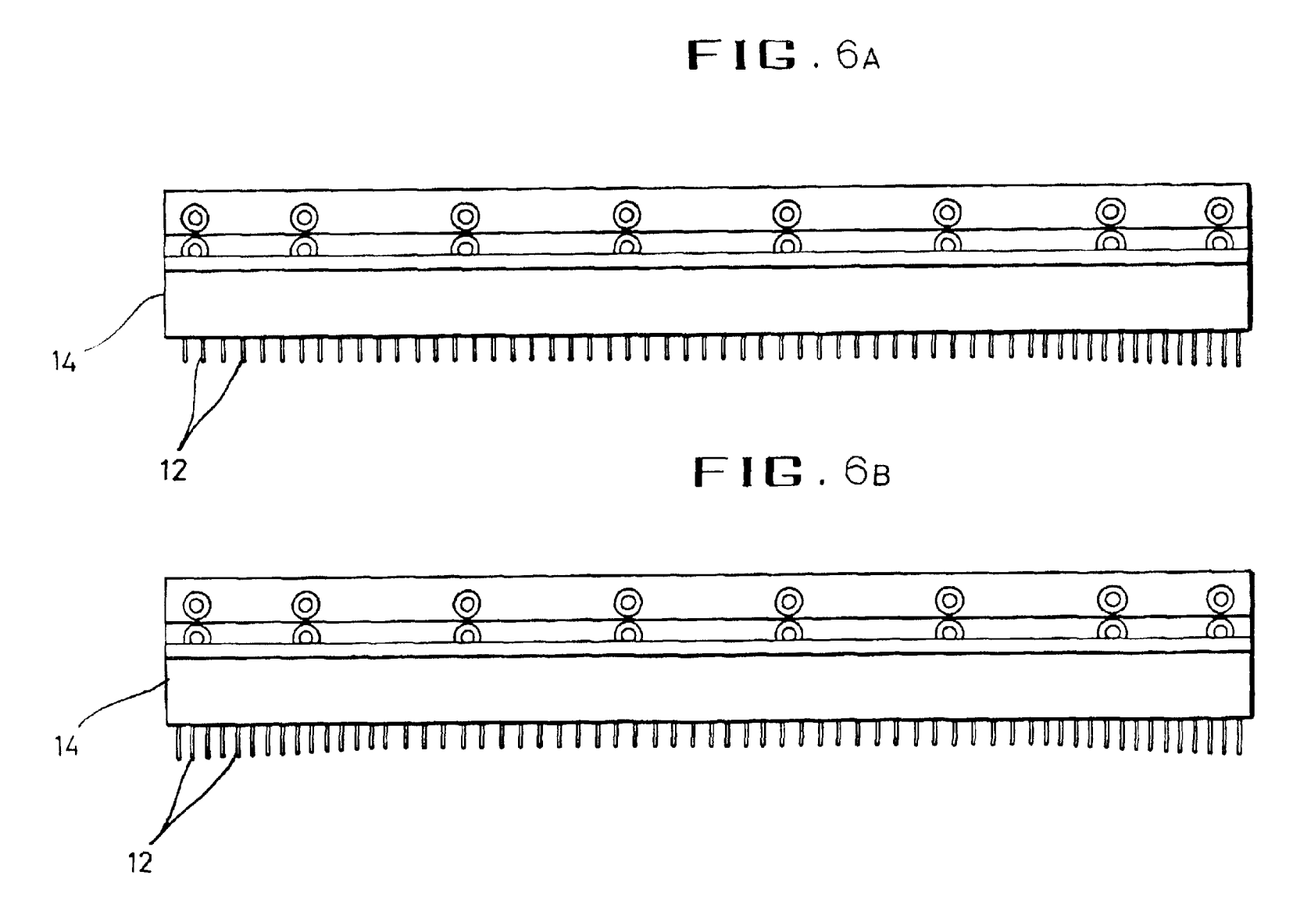
FIG. 6a is a front view of a pin kit according to the invention, depicting one possible slanted pin mounting configuration according to the pin intervals.
FIG. 6b is a front view of a pin kit according to the invention, depicting another possible slanted pin mounting configuration according to the pin intervals.

When the height control bolts 27 proximate the narrowly-spaced pins 12 is rotated in a counterclockwise direction, the buffer plate 10 fixed to the clamp 20 by magnetizing force of the magnets 9 and 25 is only slightly lowered to provide an angular orientation, or slant, for the lowest of the pins 12, as shown in FIGS. 6a and 6b.

Accordingly, the load is maintained uniformly on the light guide panel 1, thereby prolonging the lifetime of the pins 12 and forming the V-shaped grooves 3 with a uniform depth in the light guide panel 1.

The height control bolts 27 may be exposed from the clamp 20. However, it is desirable to provide a lock plate 29 with an engagement 28 on the clamp 20 to cover the height control bolt 27.

Each of the height control bolts 27 may be rotated to a different depth for each interval of the V-shaped grooves 3 on the light guide panel 1 to control the exposed length of pins 12. The lock plate 29 then prevents a predetermined exposed length of the pins 12 from being changed by extraneous forces during formation of the V-shaped grooves 3 in the light guide panel 1.

Figure 8:
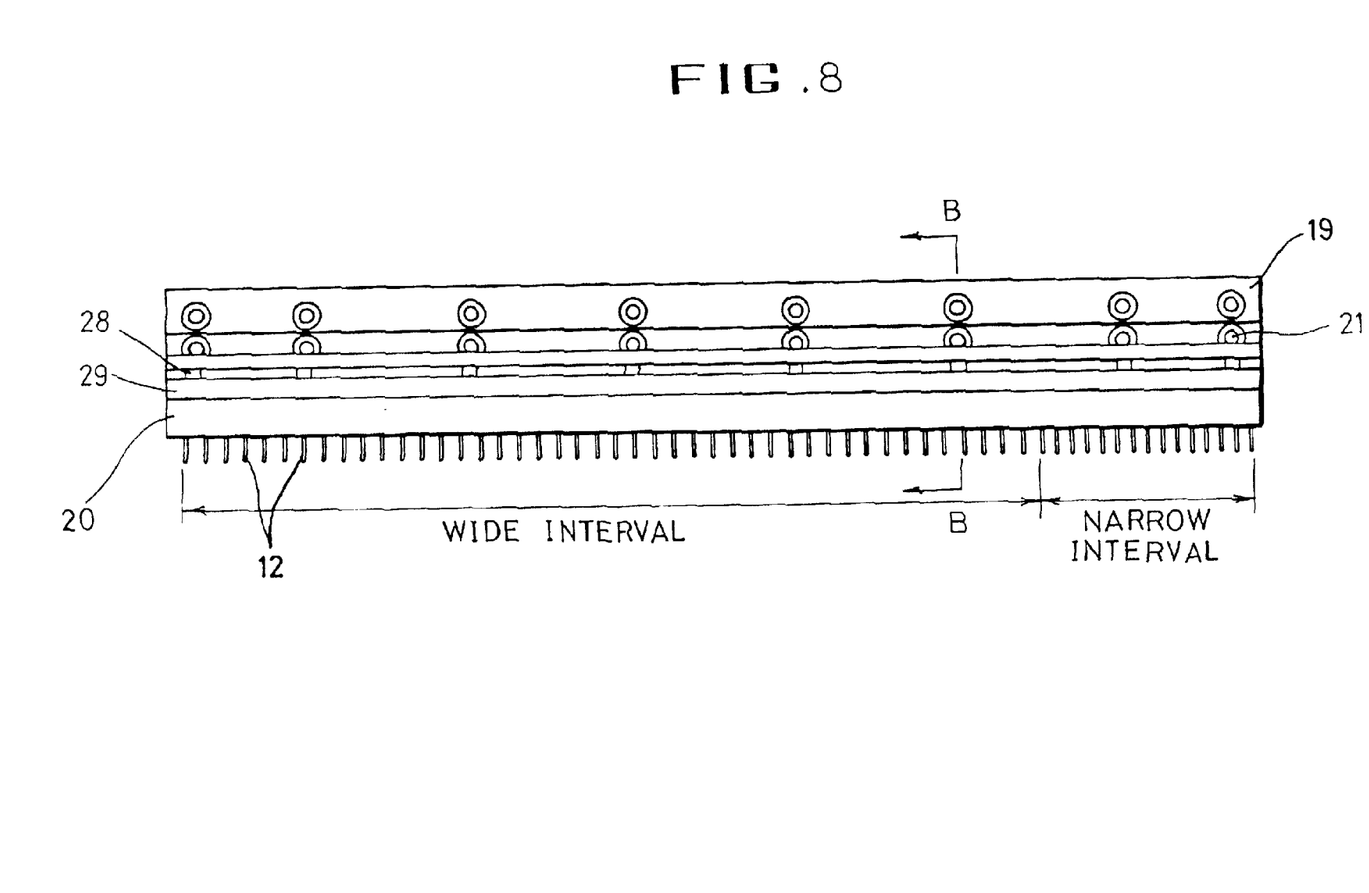
FIG. 8 is a front view of the pin kit of FIG. 7, in a fully-assembled state.
Figure 9:
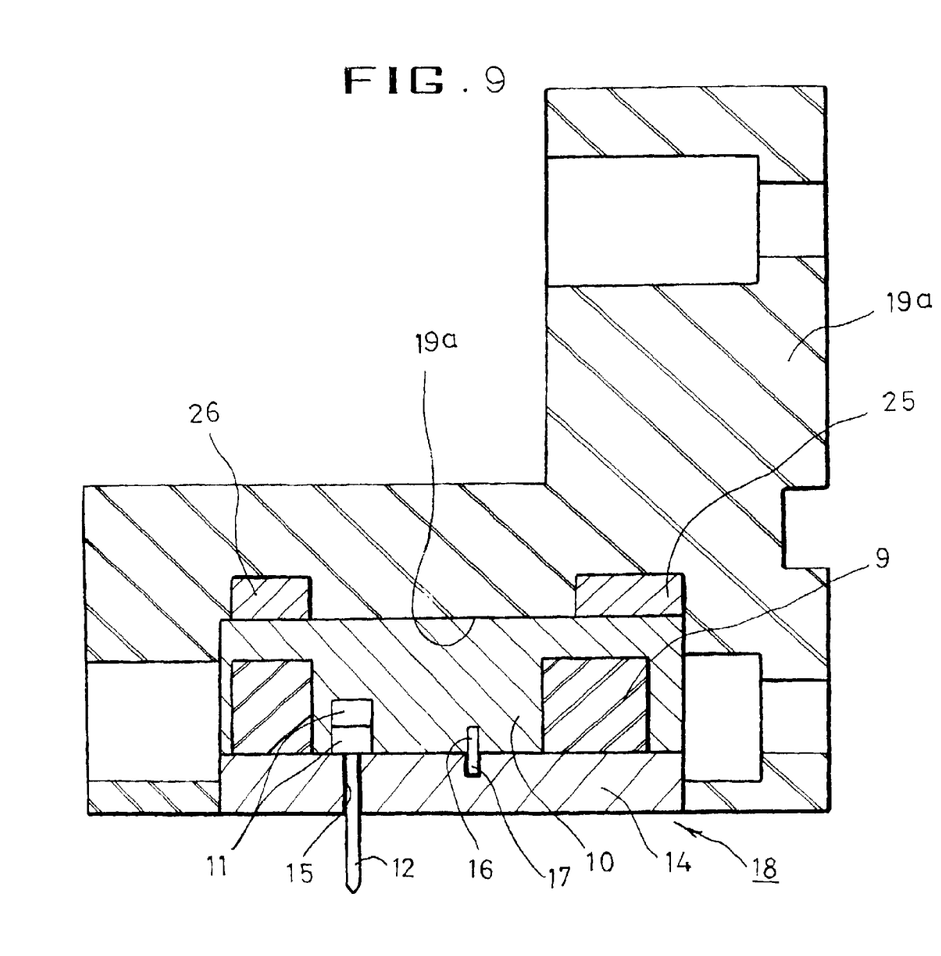
FIG. 9 is a sectional view of the pin kit of FIG. 7, taken along the line B—B of FIG. 8.

FIG. 7 is a disassembled perspective view of another embodiment according to the present invention, and FIG. 8 is a front view of the embodiment of FIG. 7 in the assembled state. FIG. 9 is a section view of the embodiment of FIG. 7.

As depicted in FIG. 7, the clamp 20 and fixation member 19 of FIG. 3 are integrally formed to provide the fixation member 19 of FIG. 7. An insertion groove 19a may be formed in the bottom of the fixation member 19 to receive the buffer plate 10. A plurality of magnets 25 and 26 may be inserted into the fixation member 19.

Without any additional supporting member, the buffer plate 10 can then be mounted in the insertion groove 19a of the fixation member 19. Rather than using the height control bolts 27 described in connection with FIGS. 3 through 6, the buffer plate 10 may simply have a slightly tapered, or ramp-shaped, configuration.

This embodiment has the advantage of cutting down the number of parts required to form the pin kit 18. The magnets 9 between the buffer plate 10 and the guide plate 14 and the magnets 25, 26 between the fixation member 19, the buffer plate 10, and/or the clamp 20 preferably have a strength, or magnetic flux density, ranging from about 2,500 Gauss to about 3,500 Gauss.

The magnets 9, 25, 26 serve to prevent dislocation of the guide and buffer plates 14, 10 from impact, and also prevent removal of the pins 12 from the insertion holes 15 of the guide plate 14. The magnetic force of the magnet 9 applied to the pins 12 is only sufficient to keep the pins 12 in place within the insertion holes 15 during normal operation of the pin kit 18. Thus, if the pins 12 are broken, they can be easily withdrawn from the insertion holes 15 for replacement.

Depending on the spacing between the V-shaped grooves 3 to be formed in the light guide panel 1, the load on the pins 12 may beneficially be adjusted by changing the angle of the buffer plate 10 that supports the guide plate 14.

Figure 10:
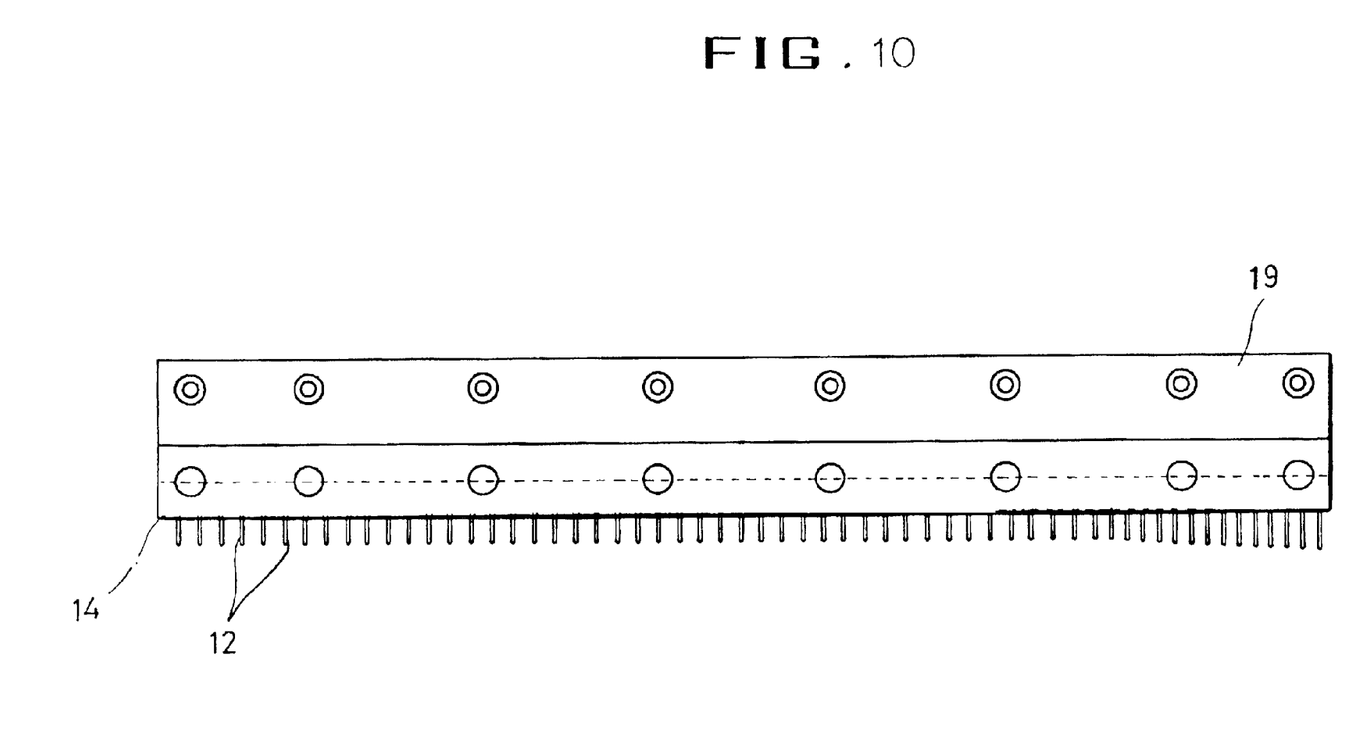
FIG. 10 is a front view of a pin kit according to the invention, depicting one possible slanted pin mounting configuration according to the pin intervals.

FIG. 10 shows the angle of mounting of the pins 12 in proportion to the pin intervals, for uniformly maintaining the load on a plurality of pins 12 during fabrication of corresponding V-shaped grooves 3 in the light guide panel 1. The buffer plate 10 is effectively thicker proximate the narrowly-spaced pins 12 and thinner proximate the widely-spaced pins 12, so that the bottom ends of the pins 12 have a comparatively uniform slant.

Even though this embodiment is simpler to construct, several buffer plates 10 with varying degrees of angular slant should be prepared in accordance with the size of the light guide panel 1 and the intervals of the V-shaped grooves 3.

If pins 12 with a larger diameter are to be inserted into the guide plate 14, the diameter of the insertion holes 15 of the guide plate 14 should be enlarged accordingly to accommodate the pins 12.

If pins 12 with a smaller diameter are to be inserted into the guide plate 14, the insertion holes 15 of the guide plate 14 should similarly be reduced in size. In such a case, it may be desirable to construct a plurality of thin plates for the guide plate 14 to keep the insertion holes 15 of the guide plate 14 straight.

The present invention has a number of advantages not found in conventional systems and methods for forming V-shaped grooves in light guide panels.

For example, through the use of a plurality of pins spaced apart at intervals corresponding to those of the V-shaped grooves to be formed in the light guide panel, only a single motion cycle need be made between the table or slider holding the light guide panel and the lift piece to which the pins are attached. Thus, the V-shaped grooves are formed much more rapidly, and with a much lower manufacturing cost.

If, for example, a conventional light guide panel includes 500 V-shaped grooves in lateral and longitudinal directions, the slider must move across the light guide panel one time with each pitch, i.e., once for each of the V-shaped grooves. Thus, the slider will have to move across the light guide panel a total of 500 times to form all of the V-shaped grooves. With the apparatus and methods of the present invention, however, one or, at most, two reciprocating movements of the table or slider and the lift piece can completely form all of the V-shaped grooves, thereby improving productivity by a factor of 250.

Additionally, the pins are inserted in the insertion holes of the guide plate and maintained by the magnetic force of the magnet inserted in the buffer plate. If one of the pins is damaged, it can quickly and easily be pulled out of the guide plate and replaced with new pin, without the need to disengage or re-engage any mechanical fasteners.

Furthermore, although the elastic member may receive different amounts of pressure depending on the pin spacing, the load can be uniformly maintained on the pins by controlling the bolt or slant of the buffer plate, thereby prolonging the useful life of the pins and enabling the V-shaped grooves to be manufactured with a uniform depth.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description.

What is claimed is:

1. A pin kit with a plurality of pins for an apparatus for forming a plurality of V-shaped grooves at a desired interval on a light guide panel, the pin kit comprising:

a buffer plate having an elastic member fixed in a groove located in the lower side of the buffer plate;

a guide plate having insertion holes for receiving a plurality of pins, the insertion holes being positioned to petmit contact between one of the pins and the elastic member;

wherein the plurality of pins are inserted into the insertion holes on the guide plate for forming V-shaped grooves in the light guide panel; and a fixation member affixed to a lift piece and a clamp having a jaw affixed to the fixation member by an engagement, wherein the buffer plate and the guide plate are disposed between the fixation member and the clamp.

2. A pin kit with a plurality of pins for an apparatus for forming a plurality of V-shaped grooves at a desired interval on a light guide panel, the pin kit comprising:

a buffer plate having an elastic member fixed in a groove located in the lower side of the buffer plate;

a guide plate having insertion holes for receiving a plurality of pins, the insertion holes being positioned to permit contact between said plurality of pins and the elastic member;

a fixation member affixed to a lift piece and having an insertion groove formed at the bottom thereof, so that the buffer plate and the guide plate can be disposed in the insertion groove; and a plurality of height control bolts in screw engagement for adjusting an angular orientation of the buffer plate in accordance with a lateral direction of the fixation member, wherein the plurality of pins are inserted into the insertion holes on the guide plate for forming V-shaped grooves in the light guide panel.

3. A pin as claimed in claim 2, wherein the elastic member comprises at least two separate materials.

4. A pin kit as claimed in claim 2, further comprising a lock plate for maintaining adjustment of the height control bolts on an upper side of the clamp, the lock plate being fixed by an engagement.

5. A pin kit as claimed in claim 2, further comprising a magnet inserted within the buffer plate, a magnet abutting the fixation member in contact with an upper side of the buffer plate, and a magnet abutting a lower side of the clamp.

6. A pin kit as claimed in claim 2, further comprising:

two joggles positioned between the buffer plate and the guide plate, wherein the joggles are affixed to one of the buffer plate and the guide plate; and two position holes formed in one of the guide plate and the buffer plate, each position hole corresponding to a joggle.

7. A pin kit as claimed in claim 2, wherein the buffer plate is comparatively thin proximate insertion holes spaced apart by a comparatively large interval, and wherein the buffer plate is comparatively thick proximate insertion holes spaced apart by a comparatively narrow interval, so as to form a substantially uniform slant of the buffer plate.

8. A pin kit as claimed in claim 7, further comprising;

two joggles positioned between the buffer plate and the guide plate, wherein the joggles are affixed to one of the buffer plate and the guide plate; and two position holes formed in one of the guide plate and the buffer plate, each position hole corresponding to a joggle.

* * * * *